(12) United States Patent
Gasbarro

(10) Patent No.: US 11,172,687 B2
(45) Date of Patent: Nov. 16, 2021

(54) KEEL HARVESTING APPARATUS AND METHOD

(71) Applicant: Prime Equipment Group, LLC, Columbus, OH (US)

(72) Inventor: Geno N. Gasbarro, Columbus, OH (US)

(73) Assignee: Prime Equipment Group, LLC, Columbus, OH (US)

( * ) Notice: Subject to any disclaimer, the term of this patent is extended or adjusted under 35 U.S.C. 154(b) by 0 days.

(21) Appl. No.: 16/789,291

(22) Filed: Feb. 12, 2020

(65) Prior Publication Data

US 2020/0260746 A1    Aug. 20, 2020

Related U.S. Application Data

(60) Provisional application No. 62/805,445, filed on Feb. 14, 2019.

(51) Int. Cl.
*A22C 21/00*    (2006.01)

(52) U.S. Cl.
CPC ...... *A22C 21/0023* (2013.01); *A22C 21/0053* (2013.01)

(58) Field of Classification Search
CPC ............ A22C 21/0023; A22C 21/0053; A22C 21/0069

USPC ................................ 452/149, 150, 154, 155
See application file for complete search history.

(56) References Cited

U.S. PATENT DOCUMENTS

| 4,477,942 | A  | * | 10/1984 | Martin ............... | A22C 21/0069 452/136 |
| 8,109,810 | B2 | * | 2/2012 | Blenkinsopp .......... | A22C 29/04 452/16 |
| 8,845,401 | B2 | * | 9/2014 | De Vos .............. | A22C 21/0053 452/136 |
| 8,974,271 | B2 | * | 3/2015 | De Vos ............... | A22C 21/003 452/136 |

* cited by examiner

*Primary Examiner* — Richard T Price, Jr.
(74) *Attorney, Agent, or Firm* — Christensen O'Connor Johnson Kindness PLLC

(57) ABSTRACT

An apparatus and method for removing a keel from a poultry carcass that is conveyed at a predetermined speed along a path. Planar members extend radially outwardly from a continuous loop driven adjacent the path at the predetermined speed. A keel-receiving gap is configured between a pair of planar members. At least one blade is disposed between the path and the continuous loop for severing the keel from the carcass. A ramp above the path has a downwardly-facing surface angled to the path for contacting the poultry carcass and adjusting its vertical position relative to the blade. A keel guide spaced from the plurality of planar members may contact the keel to adjust the keel relative to the blade.

14 Claims, 10 Drawing Sheets

KEEL HARVESTING APPARATUS AND METHOD

CROSS-REFERENCE TO RELATED APPLICATION

This application claims the benefit of U.S. Provisional Application No. 62/805445, filed Feb. 14, 2019, the entire contents of which are expressly incorporated herein in their entirety.

BACKGROUND

The invention relates generally to food processing devices and methods, and more particularly to a device and method for removing the keel from the carcass of a poultry animal, such as a chicken, turkey or any other bird.

It is known that a poultry keel has value in the pharmaceutical industry and in some food markets. The keel is an extension of the sternum (breastbone) and extends axially along the sternum, perpendicular to the plane of the ribs. The keel is cartilaginous and attaches to the sternum. In order to harvest the keel, one must sever it from the sternum. However, it is preferred to sever the keel without including any bone particles from the sternum.

Historically keel removal has been performed manually, such as by a human slicing the keel away from the breastbone using a hand-held knife. This is an operation that includes risk of injury. Because food processing machines can operate at higher speeds, with greater predictability and accuracy, many machines have been developed that remove the keel from the skeleton of poultry at high speed and/or at high volume. However, such machines do not accurately and efficiently remove only the keel. Most prior art machines either remove some bone or leave too much keel behind on the carcass.

There is a need for a keel-removing apparatus and method that removes the keel efficiently and reduces or eliminates injury risk to humans.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Disclosed herein is an apparatus for removing a keel from a poultry carcass that is conveyed at a predetermined speed along a path. The apparatus comprises a plurality of spaced members that are disposed adjacent the path and that define at least one gap, between the spaced members, that is configured to receive the keel. The spaced members are configured to move at the predetermined speed. A blade is disposed adjacent the path and the spaced members and is configured to sever the keel from the poultry carcass.

In some embodiments, the apparatus may include a keel guide, disposed adjacent the path and spaced from the plurality of spaced members, for contacting the keel and adjusting the keel relative to the blade. In some embodiments, a ramp may be disposed adjacent the path. The ramp may have a surface angled relative to the path for contacting, and adjusting a vertical position relative to the blade of, the poultry carcass. In some embodiments, a keel guide is disposed adjacent the path and spaced from the plurality of spaced members for contacting the keel and adjusting the keel relative to the blade. In some embodiments, the blade's edge may face downwardly. In some embodiments, a knife with a sharp edge may be mounted in the path adjacent the blade. In some embodiments, the knife's sharp edge may be disposed above the blade's edge and may face away from the plurality of spaced members. In some embodiments, the knife's sharp edge may be disposed at least partially in a groove formed in the plurality of spaced members between a top edge of the plurality of spaced members and a lower edge of the plurality of spaced members.

Further disclosed herein is an apparatus for removing a keel from a poultry carcass that is conveyed at a predetermined speed along a path. The apparatus comprises a plurality of planar members extending radially outwardly from a continuous loop configured to be driven adjacent the path at the predetermined speed. At least one pair of planar members defines a keel-receiving gap therebetween that is configured to receive at least the keel. A stationary blade with a sharp edge is disposed between the path and the continuous loop for severing the keel from the carcass. A ramp is disposed above the path, and the ramp has a downwardly-facing surface angled to the path for contacting, and adjusting a vertical position relative to the blade of, the poultry carcass. A keel guide is disposed adjacent the path, and spaced from the plurality of planar members, for contacting the keel and adjusting the keel relative to the blade.

In some embodiments, a knife with a sharp edge may be mounted in the path adjacent to the blade. In some embodiments, the knife's sharp edge may be disposed above the blade's sharp edge and may face away from the plurality of spaced members. In some embodiments, the blade's sharp edge may face downwardly. In some embodiments, the knife's sharp edge may be disposed at least partially in a longitudinal groove formed in the plurality of spaced members between a top edge of the plurality of spaced members and a lower edge of the plurality of spaced members. In some embodiments, the continuous loop may further comprise a top member that is rectangular and a bottom member that is triangular, with a gap therebetween that forms the longitudinal groove.

Disclosed herein is a method of removing a keel from a poultry carcass that is conveyed along a path at a predetermined speed. The method comprises driving a continuous loop adjacent the path at the predetermined speed, the continuous loop having at least one pair of planar members extending radially outwardly therefrom to define a keel-receiving gap therebetween that receives at least the keel. The method further comprises disposing a ramp above the poultry carcass, wherein the ramp has a surface angled to the path for adjusting the poultry carcass on the elongated member relative to the blade. The method further comprises disposing a keel guide adjacent the path and spaced a predetermined distance from the plurality of planar members for adjusting the keel relative to the blade. The method further comprises conveying the keel into at least one blade mounted between the path and the continuous loop, thereby severing the keel from the carcass.

In some embodiments, the method may further comprise the step of disposing a sharp edge of a knife at least partially in a longitudinal groove formed in the plurality of spaced members between a top edge of the plurality of spaced members and a lower edge of the plurality of spaced members.

The poultry carcass may be positively positioned by the planar members or spaced members so that the blade punctures the keel precisely where desired, and then severs keel cartilage away from bone.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

Figure 1:
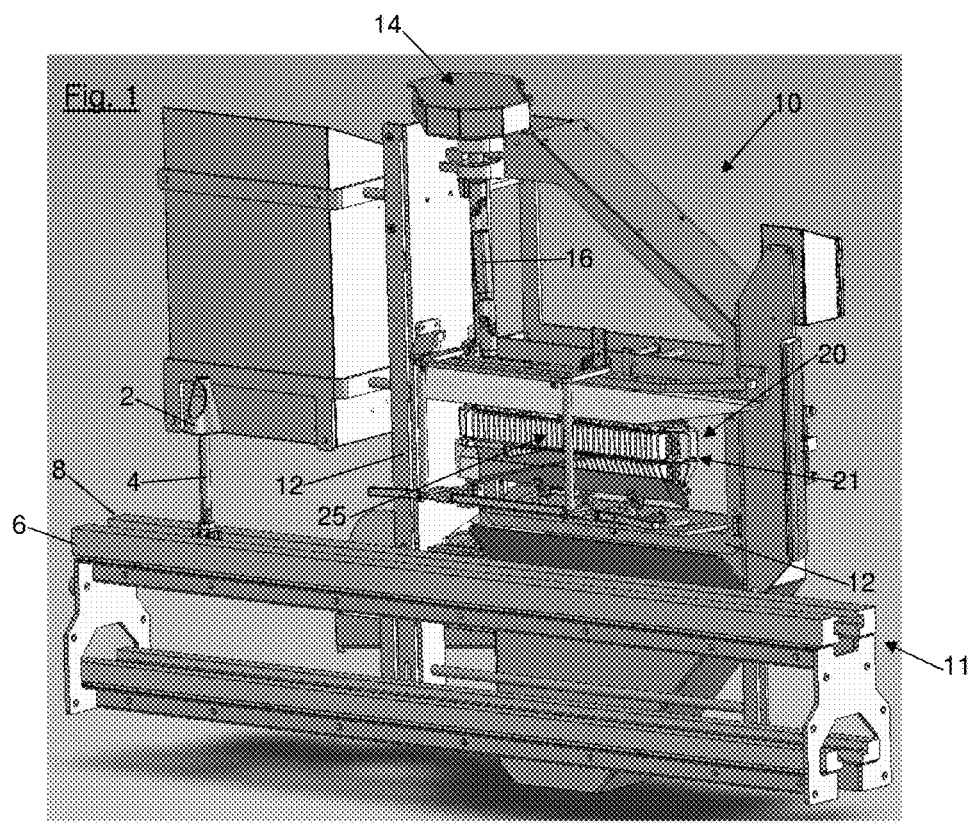
FIG. 1 is a view in perspective illustrating an embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

The apparatus 10 is an embodiment of the present invention and has a rigid frame 12 providing a foundation that may be made of stainless steel or any other suitable material, and to which numerous components attach. The apparatus 10 is shown in some illustrations with shields, guards and other safety features removed from the frame 12 for clarity, but with other structures attached to the frame 12. These safety features do not constitute any portion of the invention, and are known to the person of ordinary skill to be common in machines of this type.

The apparatus 10 may be arranged along a cone line 11, which is a conventional means for transporting poultry carcasses through a food production facility so that portions of each carcass may be removed by machines along the path. A cone line has a plurality of cones, such as the cone 2, disposed on tops of a plurality of shafts, such as the vertically oriented shaft 4, which are fixed at their lower end to a drive loop (not visible).

Each carcass has a cavity that each cone extends into from below. Examples of a drive loop include chains, cables and belts that are driven by a prime mover, such as a servomotor, at a predetermined, and preferably constant, speed.

In one embodiment of the cone line 11, the lower end of the shaft 4 is mounted, along with numerous other substantially identical, equally-spaced shafts, to a chain that is driven by an electric servomotor between the rails 6 and 8. In the embodiment of FIG. 1, and as best viewed in FIG. 4, the rails 6 and 8 have facing grooves that receive a shaft base to which the lower ends of the shaft attaches. The shafts and cones of the cone line 11 are thus driven along a linear path spaced a consistent distance from the cutting, guiding and positioning components of the apparatus 10 that are mounted to the frame 12, and which are described in detail herein. This configuration permits the poultry carcasses that are placed on the cones of the cone line 11 to be conveyed along the cone line in a conventional manner, and to be acted upon by the apparatus 10 for mechanical removal of a substantial portion of the keel as described herein.

Figure 17:
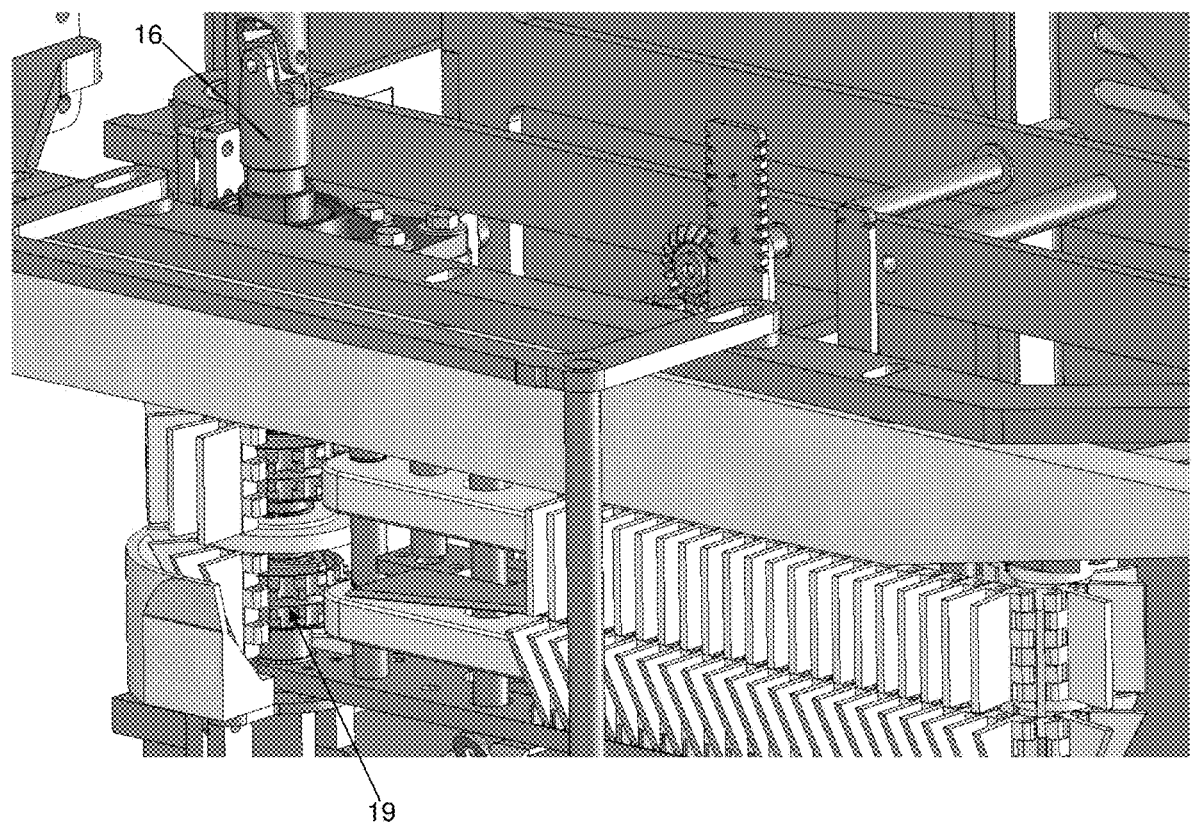
FIG. 17 is a view in perspective illustrating an embodiment of the invention with a portion of the belt and other components removed to expose the gear 19.

Turning now to the main components of the apparatus 10, a prime mover, which may be a rotary electric servomotor 14 protected by a housing, may be attached to the 5 frame 12. A driveshaft 16 may extend from the servomotor to a driving link connected to a continuous loop, which may be the belt 20. The driving link may be a gear 19 (FIG. 17) or other toothed structure that is drivingly linked to, and aligned along, the driveshaft 16 and positively engages the belt 20 to propel the belt 20. Other equivalent driving links may be substituted.

Figure 6:
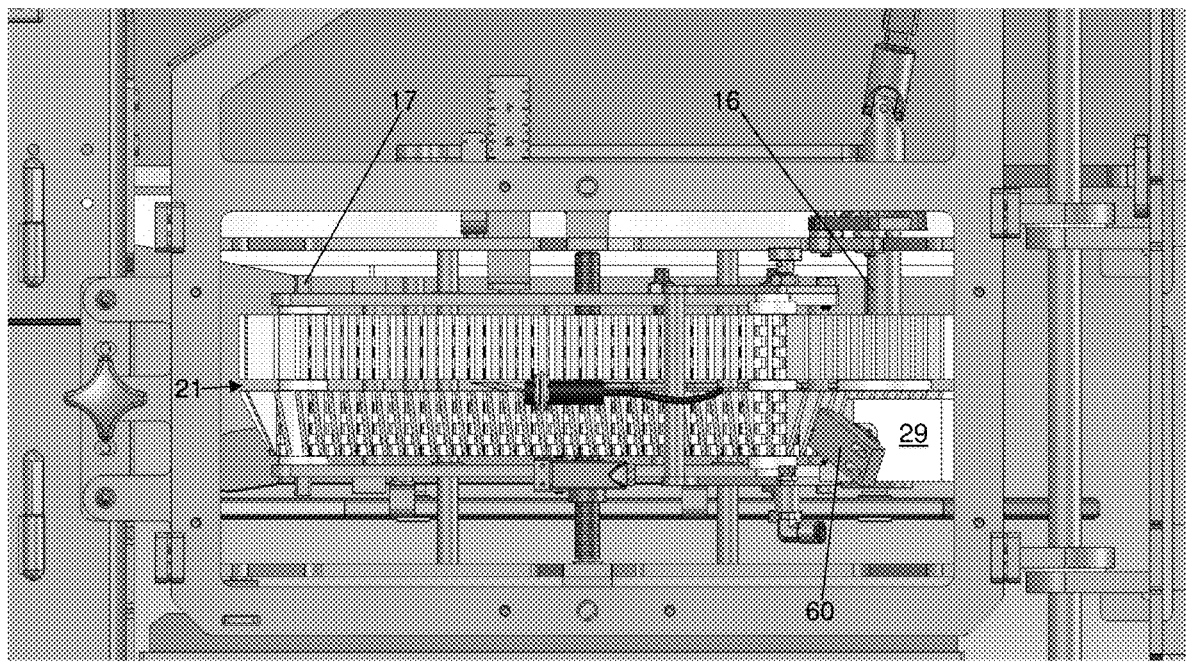
FIG. 6 is a rear side view illustrating the embodiment of FIG. 1.
Figure 7:
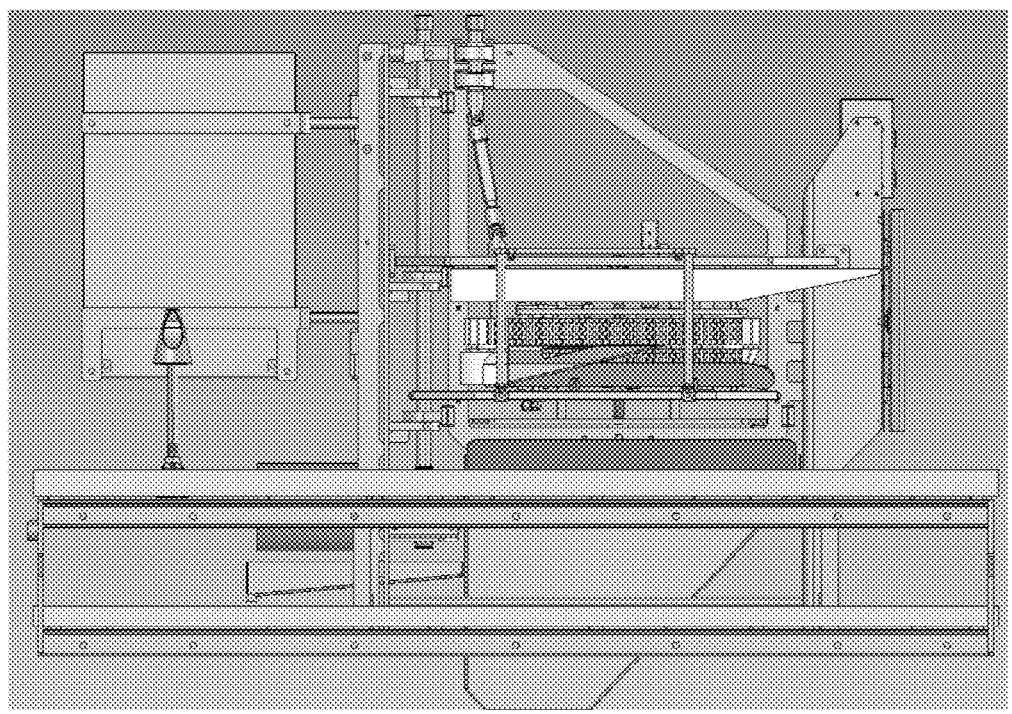
FIG. 7 is a front side view illustrating the embodiment of FIG. 1.

The belt 20 is capable of following a curved path, which may extend around the driveshaft 16 and the gear 19. An idler axle 17 (see FIG. 6), which is parallel to the driveshaft 16 and may be rotatably mounted to the frame 12, is mounted at an opposite end of the belt 20 from the driveshaft 16. The belt 20 may extend around the axle 17 in the manner of a conveyor belt, and other driven or idler axles may guide the belt 20 around its path. Thus, the belt 20 extends around the driveshaft 16 and gear 19 at one belt end, and a parallel idler axle 17 at the opposite belt end, and is driven therearound during use by the prime mover 14.

Numerous configurations of a continuous loop are contemplated to form the belt 20. One such configuration includes a flexible rubber strip, which may instead be polyurethane or another flexible material. Planar panels may be fastened to the flexible material of the belt at regular longitudinal intervals to form spaced members with gaps therebetween. Pins or other slender structures may be used in place of panels. Rather than including a flexible material, the continuous loop may include a plurality of substantially rigid, pivotably attached planar plates 22 that articulate to permit the belt 20 to extend through the curved path around axles. This articulating belt thereby simulates a flexible material. There are keel-receiving gaps 23 formed between adjacent pairs of plates 22, into which the keels may be inserted. Each of the keel-receiving gaps 23 may receive, and thus positively position, a keel that extends from a carcass on the cone line.

The belt 20 may be driven at a linear speed substantially equal to the speed of the carcasses on the cone line 11, although this speed may be variable. A long, straight span 25 (FIG. 2) of the belt 20 extends between the driveshaft 16 and the idler axle 17, closest to the cone line 11. It is this span 25 that engages the keels while they are connected to their respective carcasses and until the keel portions are removed. The span 25 may be parallel to the cone line 11.

As the span 25 portion of the belt 20 is translated along, it maintains each keel in a corresponding keel-receiving gap 23 between two plates 22. It is contemplated to speed up or slow down the belt 20 in order to rotate a carcass on the cone for advantageous purposes, but this is not preferred. Preferably, the belt 20 maintains the keel's longitudinal position relative to the respective cone. By holding a keel in a corresponding gap 23 between two adjacent plates 22 that move the same speed as the cone, the rotational position on the cone of the respective carcass is maintained.

Figure 3:
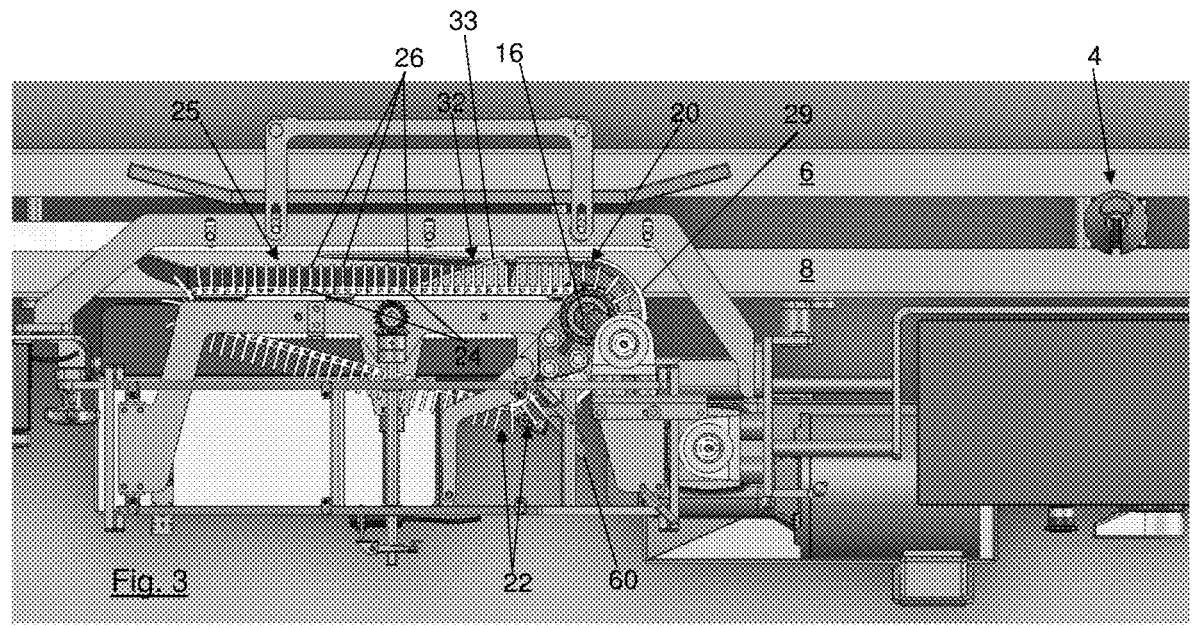
FIG. 3 is a top view illustrating the embodiment of FIG. 1.

As shown in FIG. 1, the span 25 may be vertically parallel to the rail 8. As shown in FIG. 3, the span 25 may be disposed directly above, and laterally parallel to, the rail 8. While still attached to a respective carcass, each of the keels is preferably positioned in a corresponding gap 23 at the upstream end of the span 25, which is the leftward end in FIG. 3. The keels travel downstream (to the right in FIG. 3) and are severed from the respective carcass between the upstream and downstream ends of the span 25.

Thus, the span 25 is the region of the belt 20 where a keel may be positioned in a respective gap 23 between the spaced, planar plates 22 while also remaining connected to a carcass on an adjacent cone. No further downstream than where the belt 20 begins to pivot around the driveshaft 16, the keel in that portion of the belt 20 will be separated from the rest of its respective carcass. The remainder of each carcass proceeds along the cone line 11 downstream of the driveshaft 16 and the keel portions are collected at the apparatus 10.

Figure 2:
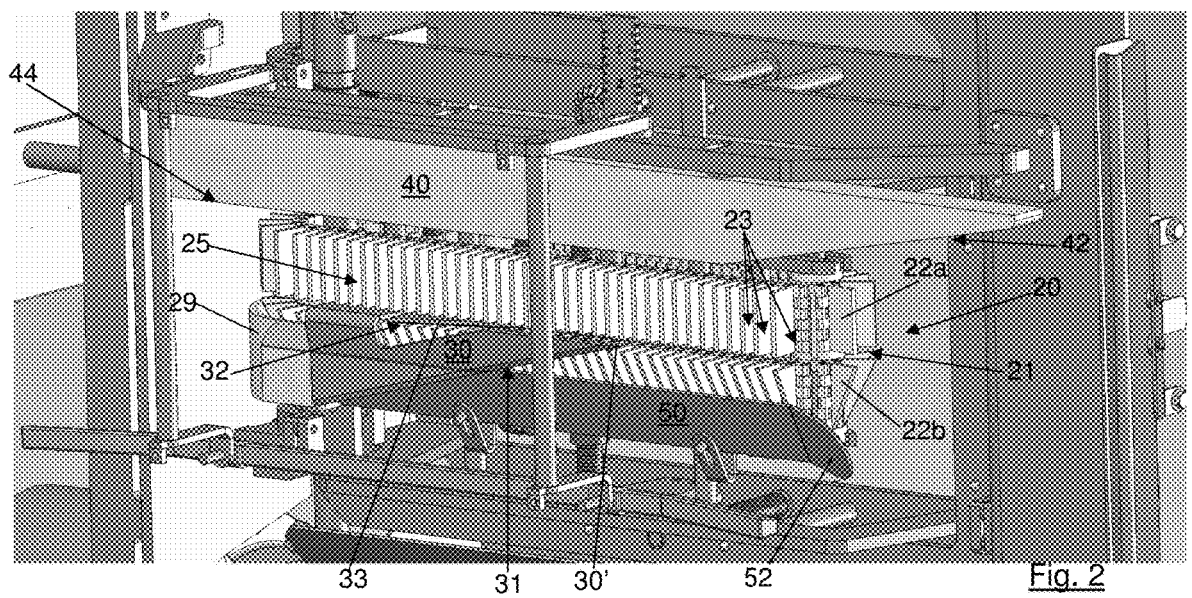
FIG. 2 is an enlarged view in perspective illustrating the embodiment of FIG. 1.
Figure 8:
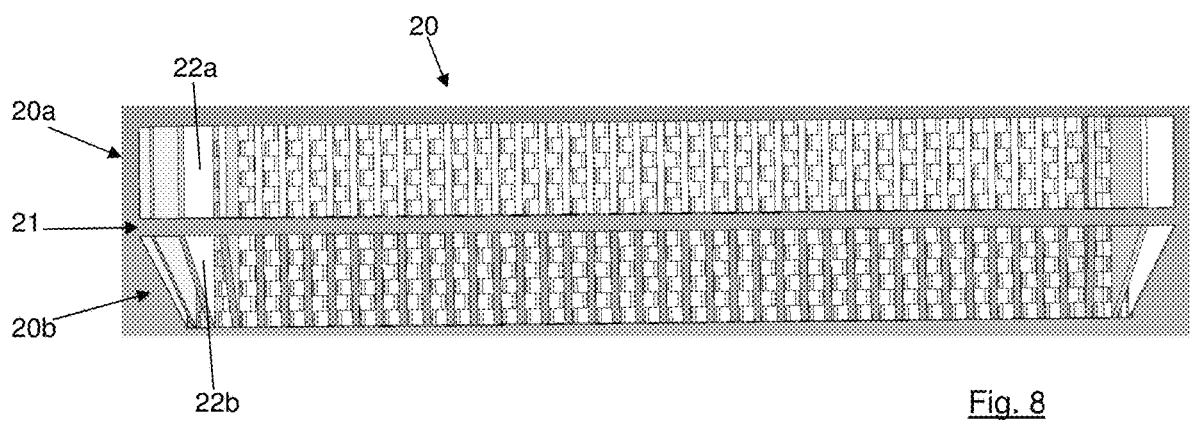
FIG. 8 is a side view illustrating the belt of the present invention.
Figure 9:
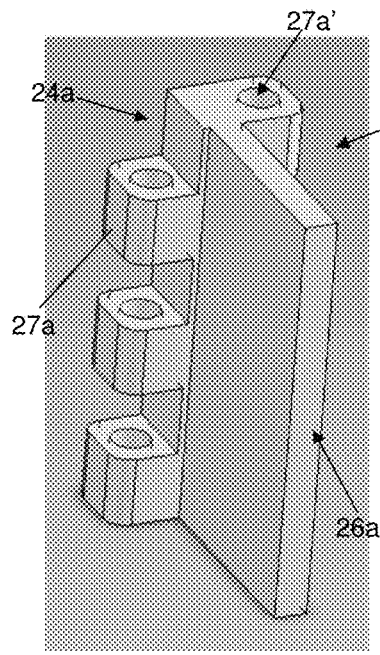
FIG. 9 is a view in perspective illustrating a preferred plate of a first belt portion.
Figure 10:
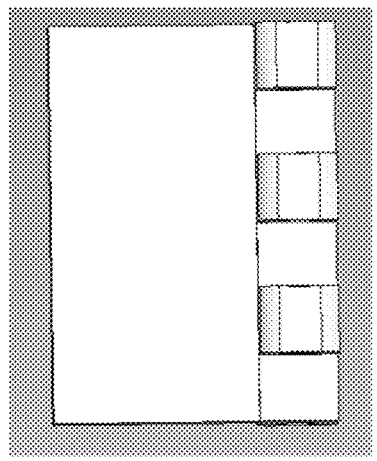
FIG. 10 is a side view illustrating the plate of FIG. 9.
Figure 11:
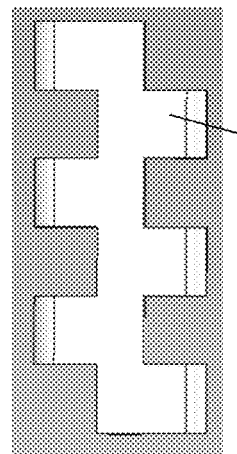
FIG. 11 is an end view illustrating the plate of FIG. 9.

As shown in FIGS. 2 and 8, the belt 20 may be made up of two belt portions 20a and 2b. Each belt portion may form a loop that is spaced (vertically in FIG. 8 and in an operable orientation) from the other belt portion by a groove 21 when the belt portions 20a and 20b are in an operable configuration. The belt portions 20a and 20b may be identical or they may differ, and the belt portions 20a and 20b may be separate or they may be drivingly linked to one another while still maintaining the groove 21 therebetween.

The preferred belt 20 may have a plurality of connected plates 22 that are all identical or that differ from one belt portion to the other. The belt portion 20a may be made up of generally rectangular plates 22a as shown in FIGS. 9-12. The belt portion 20b may alternatively be made up of generally triangular plates 22b as shown in FIGS. 13-16. The triangular shape may accommodate the guide 50, described below. In an operable orientation, each of the plates 22a and 22b of a corresponding plate pair on the adjacent belts 20a and 20b may be aligned within a single plane. Furthermore, the plates of each such pair may be hinged to pivot simultaneously. This maintains each respective plate in each plate pair within the same plane throughout the entire traversal of the belt 20 through the apparatus 10, even as plate pairs change position by pivoting relative to next adjacent plate pairs. Corresponding plate pairs 22a and 22b on different belt portions 20a and 20b, respectively, may be separated by a groove 21 formed between the lower edges of the plates 22a and the upper edges of the plates 22b (in the orientation of FIGS. 2 and 8).

As shown in FIGS. 9-12, each of the plates 22a may have an inner end 24a that pivotably mounts to another plate's inner end to form a continuous loop. Each of the plates 22a may have an outer, free end 26a that extends radially outwardly from the loop when multiple such plates 22a are mounted together.

As shown in FIGS. 13-16, each of the plates 22b may have an inner end 24b that pivotably mounts to another plate's inner end to form a continuous loop. Each of the plates 22b may have an outer, free end 26b that extends radially outwardly from the loop when multiple such plates 22b are mounted together. Each of the plates 22a and 22b may have knuckles 27a and 27b, respectively, that are interlaced with the knuckles of an adjacent plate to form a hinge at the inner ends 24a and 24b, respectively, when conventional hinge pins 27c are extended through openings 27a' and 27b' in the knuckles 27a and 27b.

Figure 12:
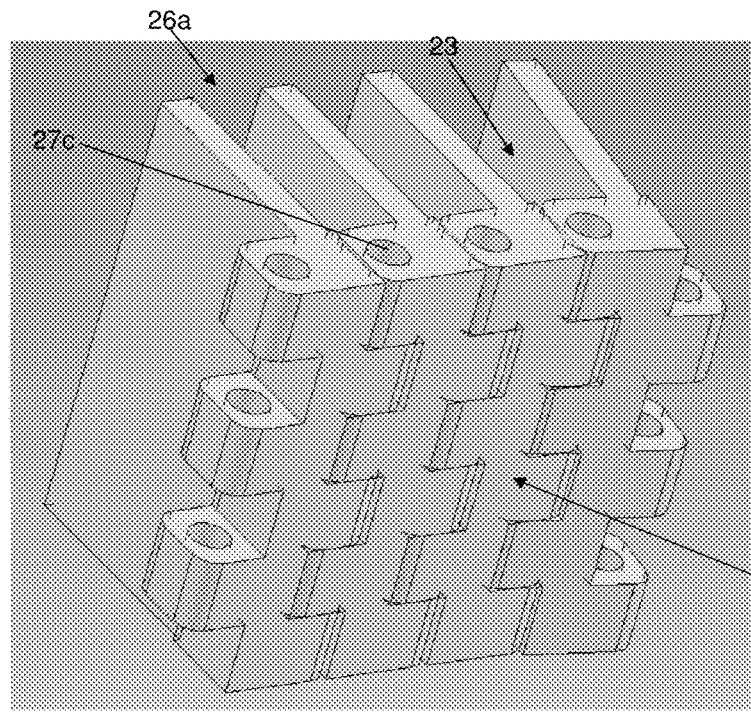
FIG. 12 is a view in perspective illustrating a plurality of pivotably attached plates of FIG. 9.
Figure 13:
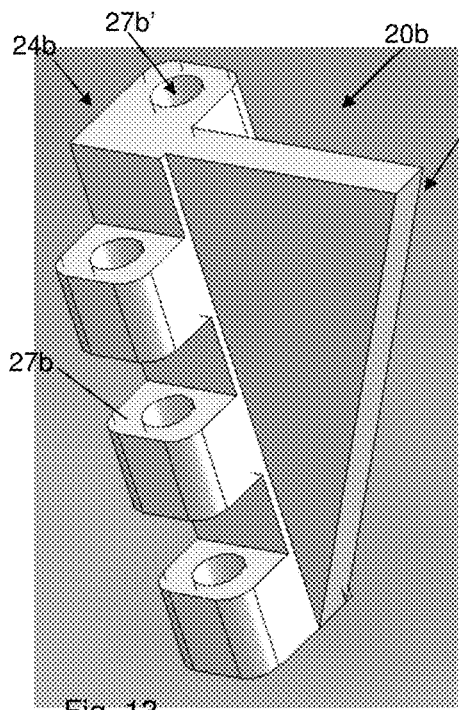
FIG. 13 is a view in perspective illustrating a preferred plate of a second belt portion.
Figure 14:
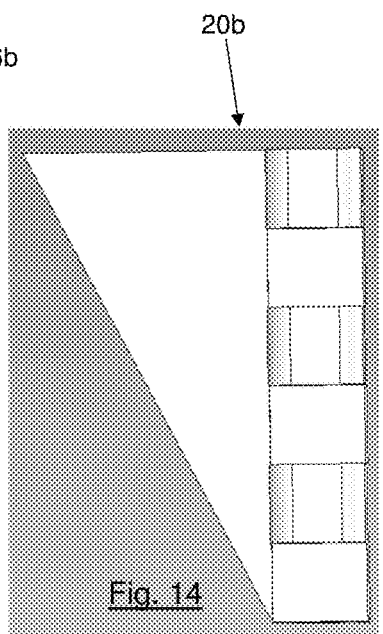
FIG. 14 is a side view illustrating the plate of FIG. 9.
Figure 15:
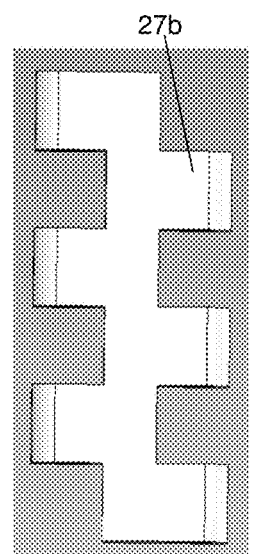
FIG. 15 is an end view illustrating the pate of FIG. 9.
Figure 16:
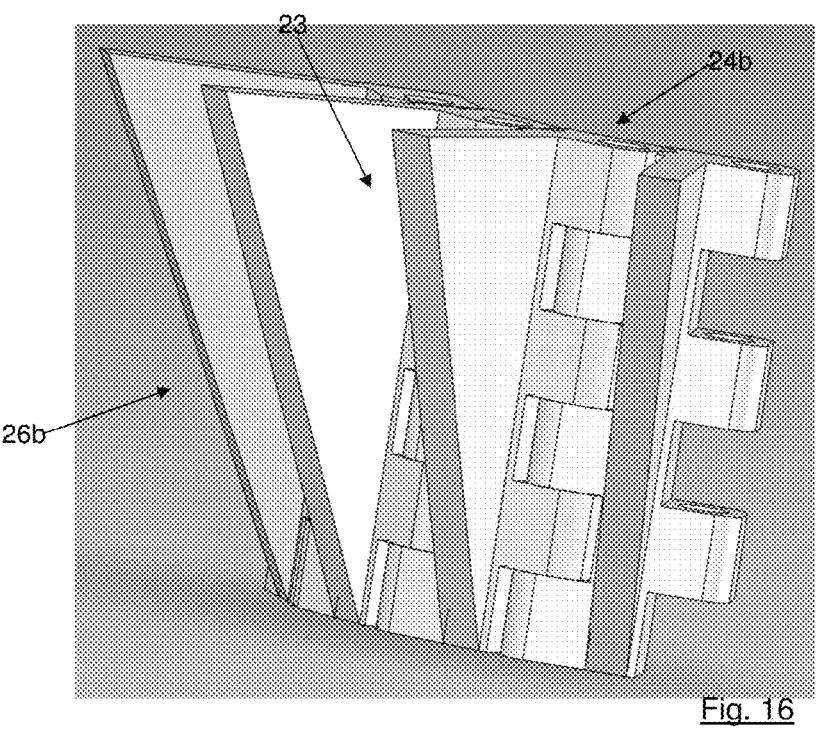
FIG. 16 is a view in perspective illustrating a plurality of pivotably attached plates of FIG. 13.

When the plates 22 of the belt 20 are assembled as described and shown herein, each of the free ends 26 may be spaced from a next adjacent plate's free end 26. This configuration defines keel-receiving gaps 23 between each pair of adjacent plates 22, as shown in FIGS. 2, 12 and 16. The plates 22 may be substantially rigid, and may be made from acetal homopolymer resin that is sold under the trademark DELRIN®. Thus, as the belt 20 is in motion, the plates 22 are not significantly distorted, but they articulate relative to one another, which approximates the flexibility of a rubber belt. This articulation allows the belt 20 to maintain the desired shape of the keel-receiving gaps 23 along the span 25, even though the gaps may vary in shape in other portions of the belt 20, such as around the driveshaft 16 and axle 17 where the gaps 23 become non-parallel and much wider. It is at the points where the belt is non-parallel and the gaps 23 are wider that the keel may be inserted more readily between two adjacent plates 22.

The belt 20 is positioned in close proximity to at least one, and preferably two, blades that sever the keel of each carcass that is transported along the apparatus 10 and positioned in a keel-receiving gap 23. The blade or blades may be stationary or moving and are preferably mounted to the frame 12. An example of a moving blade is a circular blade that is rotated in the manner of a circular saw with a sharp peripheral edge placed in contact with the keel. Another example is a band-saw blade in which a continuous strip of material that is sharpened on at least one edge is tightly disposed around a driven wheel and an idler wheel, and the keel is placed in contact with the sharp edge. Other moving blades are known to be equivalent to these examples.

Figure 5A:
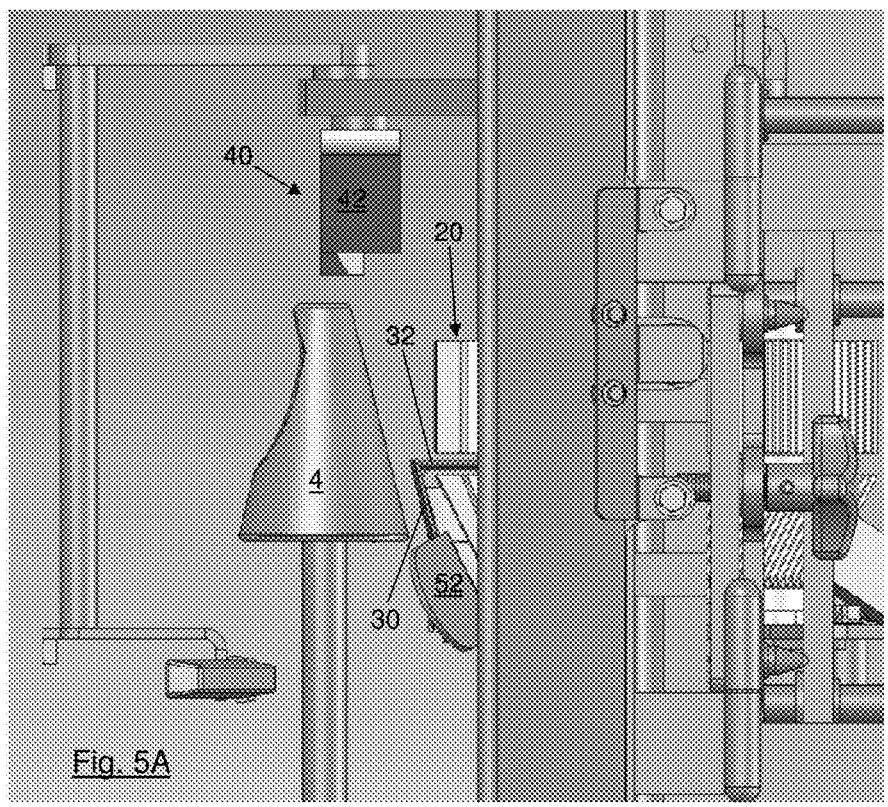
FIG. 5A is an enlarged end view illustrating the embodiment of FIG. 1.
Figure 5B:
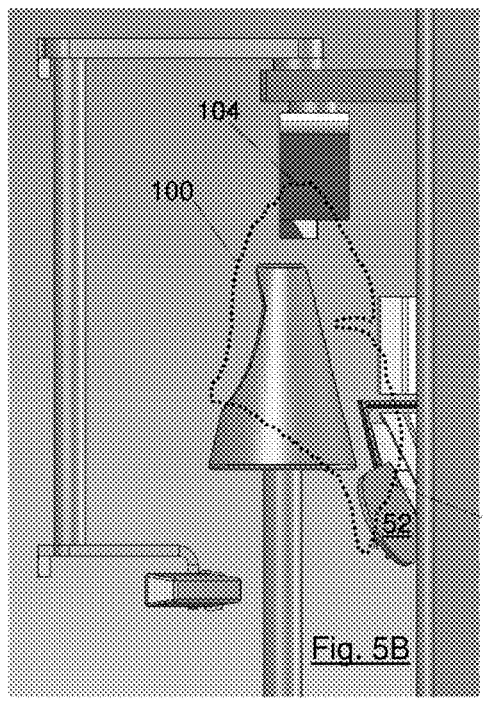
FIG. 5B is a view illustrating embodiment of FIG. 5A with a carcass mounted in an operable position and shown in dotted lines.
Figure 5C:
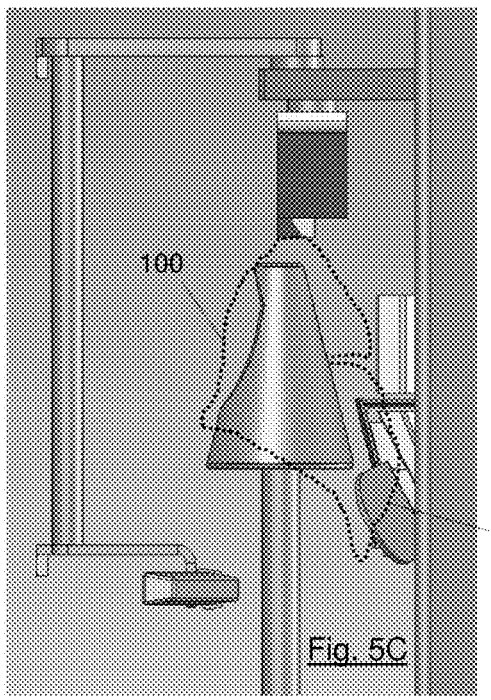
FIG. 5C is an end view illustrating the embodiment of FIG. 5B with the carcass shown farther downstream than in the view of FIG. 5B.
Figure 5D:
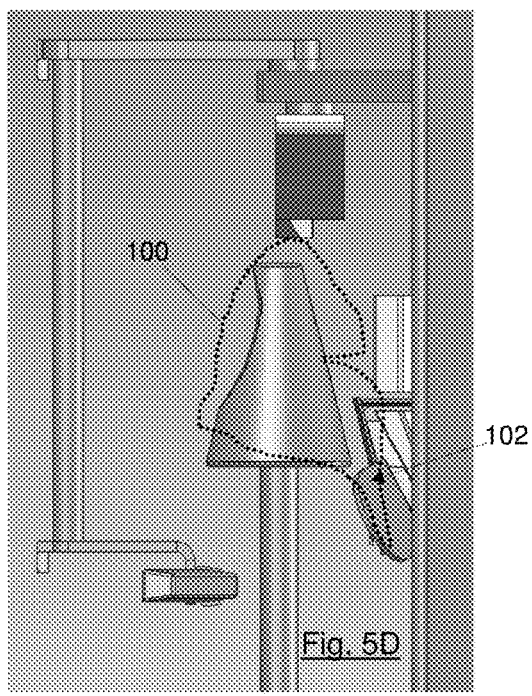
FIG. 5D is an end view illustrating the embodiment of FIG. 5C with the carcass shown father downstream than in the view of FIG. 5C.
Figure 5E:
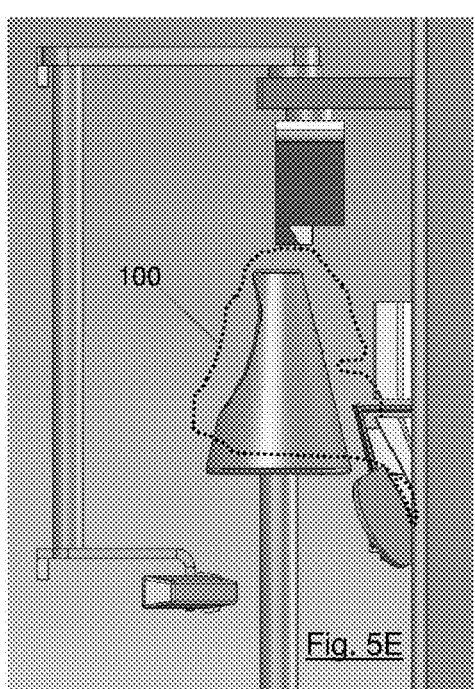
FIG. 5E is an end view illustrating the embodiment of FIG. 5D with the carcass shown father downstream than in the view of FIG. 5D.
Figure 5F:
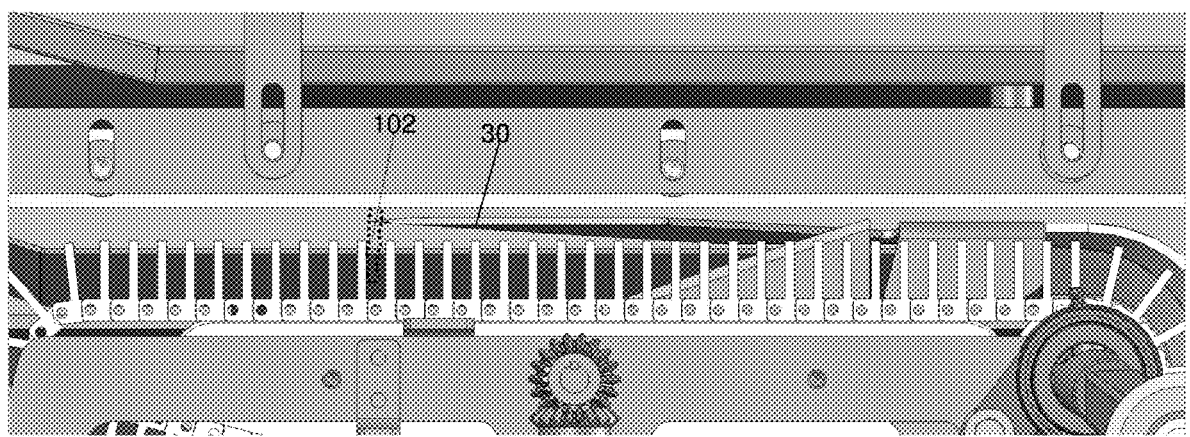
FIG. 5F is a top view illustrating the embodiment of FIG. 5D with the keel shown in dotted lines.
Figure 5G:
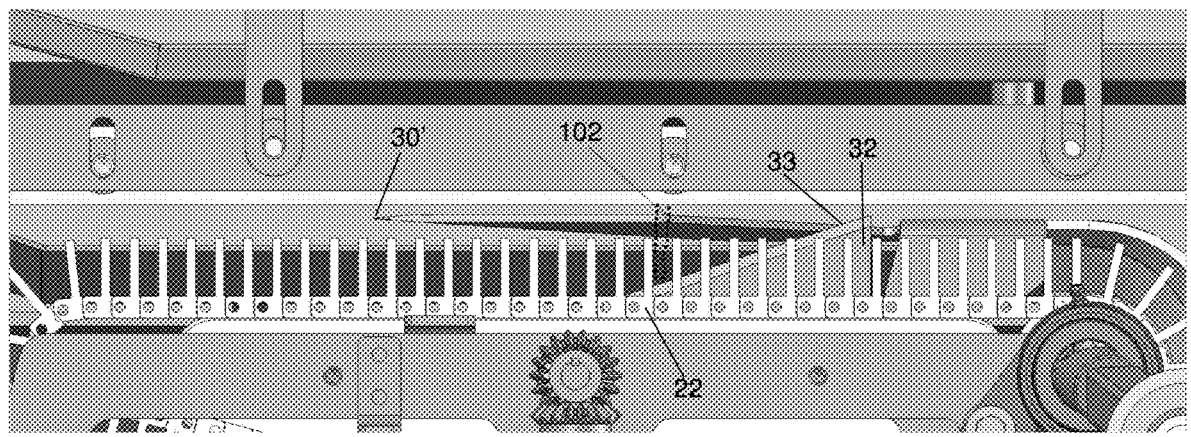
FIG. 5G is a top view illustrating the embodiment of FIG. 5F with the keel shown further downstream than in the view of FIG. 5F.
Figure 5H:
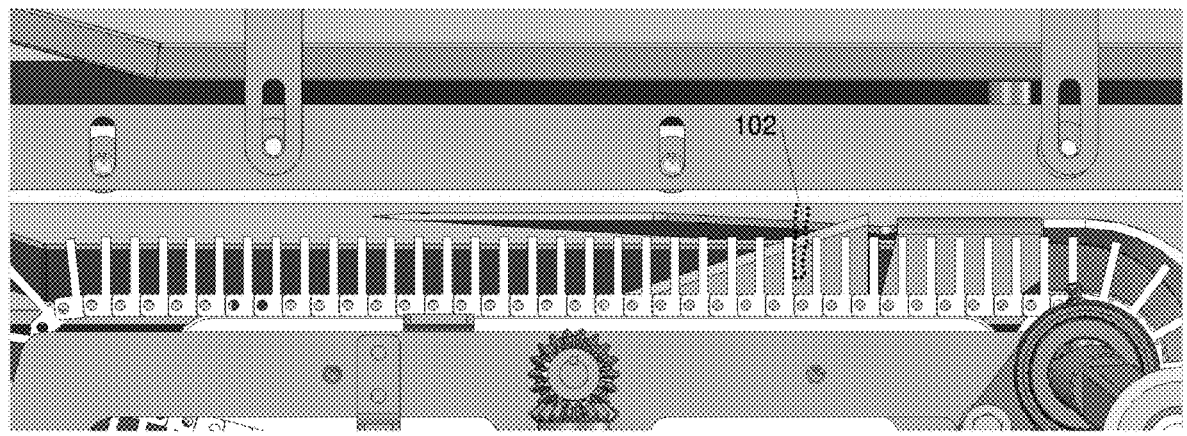
FIG. 5H is a to view illustrating the embodiment of FIG. 5G with the keel shown further downstream than in the view of FIG. 5G.
Figure 18:
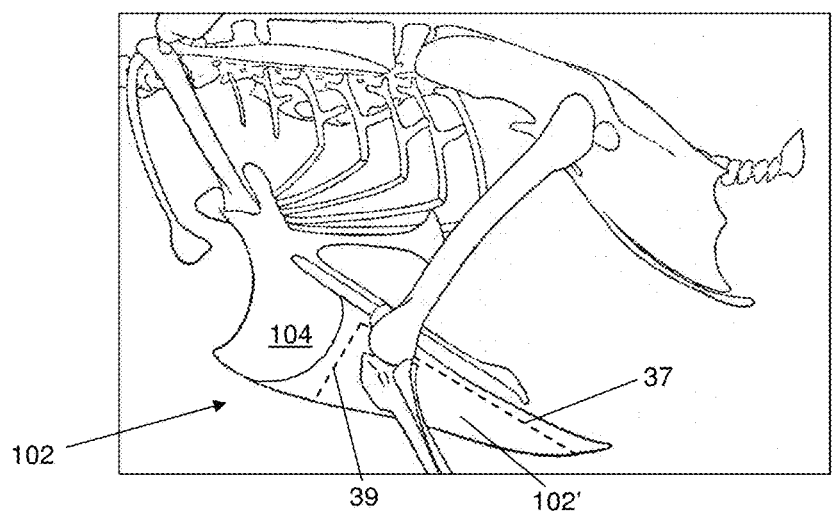
FIG. 18 is a schematic side view illustrating a convention poultry skeleton with broken lines representing locations of incisions by an embodiment of the present invention.

As shown in FIGS. 2 and 5F-FI, a first stationary blade 30 has a pointed tip 30' that is able to puncture the cartilage of the keel 102 below the sternum 104 (FIG. 18) when the keel is driven along the apparatus 10. The blade 30 may be an elongated plate contained in a substantially vertical plane and with a length aligned parallel to the cone's path. The blade 30 has a downwardly facing sharp edge 31 that is preferably laterally parallel to the path of the cones. The edge 31 may be angled relative to horizontal, such as with the downstream end positioned lower than the upstream end (at the tip 30'). The edge 31 thus cuts downwardly through the keel as the keel is driven along the blade 30 after insertion of the tip 30', thereby forming a substantially vertical incision 37. In an alternative, the blade may cut upwardly as the keel progresses downstream.

As shown in FIGS. 2, 3, and 5F-FI, a second stationary blade, such as the knife 32, may also be an elongated plate with a length that is aligned parallel to the path of the cones, and may be mounted to the frame 12. The plane in which the knife 32 is contained may be oriented substantially horizontally, thereby being at least transverse, and preferably substantially perpendicular, to the plane of the blade 30. The knife 32 is positioned to make a horizontal incision 39 that intersects with the vertical incision 37 formed by the blade 30, thereby finishing the removal of a keel portion 102' from the carcass. The knife 32 has a sharp edge 33 facing the carcass (facing away from the belt 20) that is angled laterally relative to the path of the cone line 11. The upstream end of the sharp edge 33 may be farther from the path of the cone line 11 than the downstream end (see FIG. 3). Thus, as the carcasses progress along the path, the distance between the vertical incision 37 formed by the blade 30 and the sharp edge 33 changes (preferably decreasing as the carcass progresses). The horizontal incision 39 in the keel formed by the knife 32 eventually intersects the vertical incision 37, thereby completely severing the keel portion 102' from the carcass.

When a keel portion 102' is severed from the carcass, it may remain in the corresponding keel-receiving gap 23 that it entered upon engaging the upstream end of the span 25. Alternatively, the keel portion may drop out and fall onto a chute or conveyor as soon as it is severed from the carcass or shortly thereafter. If the keel remains in the corresponding gap 23, it may be retained there by a guard 29 (FIG. 3) until it reaches the opposite side of the apparatus 10. The guard 29 may be a curved plastic or metal shield that is positioned close to the ends 26 of the plates 22 as they are driven around the drive shaft 16, where they are angled relative to one another from a substantially parallel relationship in the span 25. A member 60 (see FIGS. 3, 4 and 6) may extend from attachment at a first end to the frame 12 to a second, cantilevered end that contacts the ends 26 of the panels 22 as the belt 20 is driven past. The member 60 contacts any keel portions that remain between the panels 22 past the guard 29 and urges the keel portions out of the keel-receiving gaps.

The location of the knife 32 in the groove 21 of the belt 20 advantageously locates the horizontal incision 39 on the keel. As noted herein, the vertical gaps between the upper and lower components of each corresponding plate pair in the belt portions 20a and 20b align along the horizontally-disposed belt to form the longitudinal groove 21. The groove 21 is sufficiently sized to permit the knife 32 to be disposed in the groove 21 with the sharp edge 33 in the path of the belt 20 and facing away from the belt 20 toward the path of the cone line 11 just below the sternum 104. This permits the knife 32 to sever the keels aligned in the keel-receiving gaps 23 along a horizontal line between each keel's distal end that is inserted farthest into a corresponding gap 23 and each keel's proximal end that is closest to the ribs.

The vertical-cutting blade 30 is disposed with its downwardly-facing sharp edge 31 outside the path of the belt 20, but still within the path of the keels adjacent the bases of the keels near the ribs. This permits the blade 30 to sever the portions of the keels that are forced into the tip 30' along the sharp edge 31.

Figure 4:
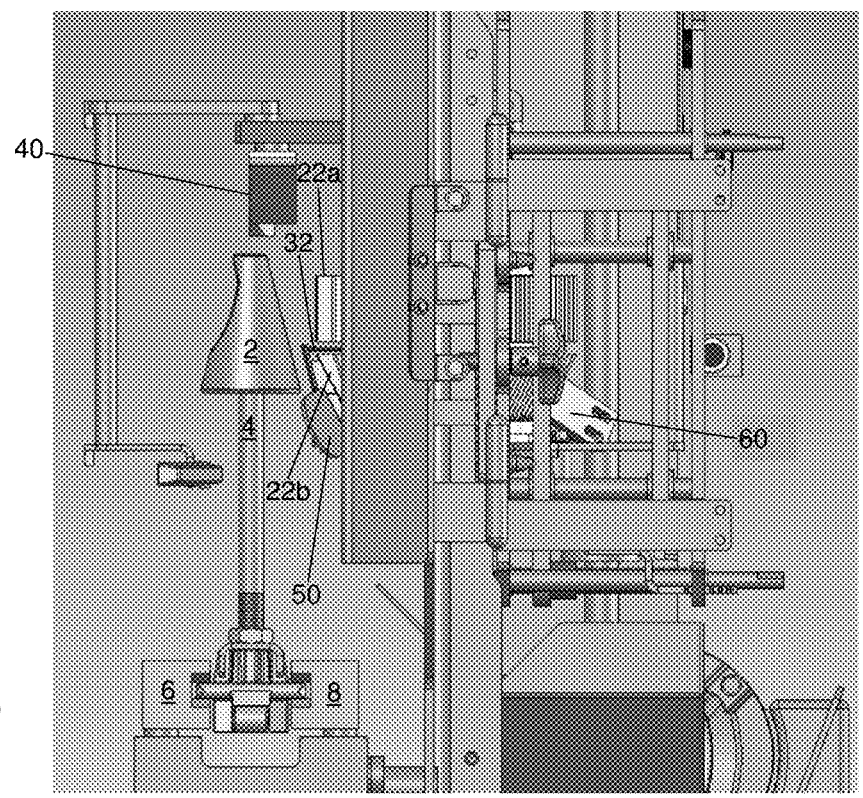
FIG. 4 is an end view illustrating the embodiment of FIG. 1.

A ramp 40 is positioned directly above the path of the cone 4, as shown in FIGS. 3, 4 and 5. The ramp 40 has a lower edge 44 that is substantially horizontal, and vertically parallel to the rails 6 and 8. An upstream edge 42 of the ramp 40 may be angled about 10 degrees from horizontal, but this angle is not critical as long as the upstream end of the ramp has sufficient angle to permit vertical adjustment of each carcass on each respective cone. The most upstream end of the angled edge 42 is farthest from the carcass, and may receive the top surface, such as the shoulders, of the carcass as the carcass is conveyed downstream by the cone 4. If the carcass is in a sufficiently low vertical position, there may be little to no contact with the angled edge 42, but if it is higher than the desired position, the angled edge 42 will force the carcass downward onto the cone.

The top surface of the carcass is preferably aligned with the lower edge 44 by the time the carcass reaches the lower edge 44, either by its original position when approaching the apparatus 10 or by contact with the angled edge 42, which drives the carcass downwardly to this alignment with the lower edge 44. The configuration of the angled edge 42 thus forces downwardly the top surface of any carcass that is too high as it is conveyed downstream. In this manner, the top surface (and the attached keel) of the carcass is at a desirable vertical position by the time the carcass is beneath the lower edge 44. By positioning the keel at a substantially predetermined vertical position relative to the lower edge 44, the keel is also positioned vertically relative to the blade 30 and knife 32. It is possible for the keel to move vertically even once it has been inserted in the keel-receiving gap 23. The ramp 40 thus vertically positions the keel relative to the blade or blades by the time the keel is cut by the apparatus 10, thereby permitting the desired portion of the keel to be removed by the apparatus 10.

A keel guide 50 is disposed along the path of movement of the carcasses. The guide 50 extends along at least a portion of the length of the span 25, as shown in FIGS. 2 and 4. The guide's 50 top edge is preferably adjacent to, or just below, the lower edge of the cone 4, and the guide 50 is disposed between the path of the cone line 11 and the belt 20. The longitudinal axis of the main portion of the guide 50 is laterally parallel to the path of the cone line 11 and the long span of the belt 20, and is vertically parallel to the lower edge 44 of the ramp 40. As is visible in FIG. 4, the guide 50 has a top edge that is tilted about 30 degrees from vertical, although this angle is not critical. Such an inclined orientation urges the lower end of the keel 102 farther from the cone line 11 than the upper end.

An upstream end 52 is angled relative to the main length of the keel guide 50 between about 5 and 20 degrees, preferably about 10 degrees. The end 52 angles away from the belt 20 to receive a misaligned lower end of the keel and urge it toward the belt 20 and away from the path of the cone line 11. The upstream end 52 of the guide 50 thus directs the keel between the guide 50 and the belt 20, thereby positively positioning the keel in the lateral direction, i.e., laterally perpendicular to the cone path. The guide 50 may affect the lateral point of insertion of the tip 30' through the keel, because the guide 50 laterally positions the keel relative to the blade 30 and knife 32. The angled end 52 and the keel guide 50 thus position the keel laterally relative to the cone line's path of travel.

The apparatus 10 may operate on the carcass of the bird in the following manner, and shown in FIGS. 5A-5I. A carcass may be disposed on a cone 4 that is shown in FIG. 5A. This can be accomplished manually by hand or automatically by a machine placing a carcass on the cone 4. The carcasses may be placed on the cones when the carcass has all of its components still attached, or just upstream from the apparatus 10 when virtually all components have been removed from the carcass. Preferably, multiple cones are used to convey carcasses past the apparatus 10, and each cone holds one carcass.

As each carcass approaches the belt 20, it may start in the position of the carcass 100 shown in dotted lines in FIG. 5B. The lower edge of the keel 102 will be received by the angled end 52 of the keel guide 50 and pulled laterally toward the belt 20 as shown in FIGS. 5D and 5E. The keel 102 is then received in a gap 23 between two adjacent plates 22 of the belt 20 as shown in FIG. 5E. The belt 20 is preferably moving at substantially the same speed as the cone 4 so that the carcass 100 and belt 20 move downstream at the same speed.

Before, simultaneously with, or subsequent to, the keel being inserted in a keel-receiving gap 23, a top surface 104 of the carcass 100 is received by the ramp 40. The angled edge 42 or the lower edge 44 of the ramp 40 will receive the top surface 104 first, depending on whether the top surface is higher than the lower edge 44. If the top surface 104 is higher than the lower edge 44, the top surface 104 will contact the angled edge 42 first. Then, as the carcass 100 is conveyed downstream toward the lower edge 44, the top surface 104 is forced downwardly by the ramp 40 (to the positions shown in FIGS. 5C-5E), thereby positioning the attached keel 102 a predetermined distance below the ramp 40. There is thus a positive positioning of the keel 102 vertically by the ramp 40, rotationally by the belt 20 and laterally by the guide 50.

Upon further movement, the keel 102 next encounters the tip 30' of the blade 30, as shown in the overhead view of FIG. 5F where the remainder of the carcass is hidden beneath the ramp 40. The tip 30' has a sharp enough point to puncture the keel 102 and then continue through the keel 102 by incising downward at the sharp, downwardly-facing edge 31 as the carcass 100 is conveyed further along the length of the blade 30. The upstream plate 22 (FIG. 5G) supports the keel 102 against the force applied to the keel 102 by the blade 30 during and after initial contact with the tip 30'. The blade 30 is stationary and substantially planar, with its plane preferably aligned in a vertical orientation. As the keel 102 progresses downstream, the downwardly-facing sharp edge 31 of the blade 30 forms a vertical incision 37 that, once the keel has progressed far enough downstream, may partially separate the keel portion 102' from the carcass.

During or after the formation of the vertical incision in the keel 102 by the blade 30, the sharp edge 33 of the knife 32 begins to incise the keel along a substantially horizontal line during movement of the keel 102 further downstream. The knife 32 is disposed within the groove 21, as shown in FIGS. 2-4, and the sharp edge 33 is angled with the most distal portion of the keel (farthest from the cone 4) being cut when the knife 32 first contacts the keel 102. As the keel 102 is conveyed downstream from its first contact with the sharp edge 33, the incision caused by the sharp edge 33 progresses toward the cone 4 due to the angle of the sharp edge 33 extending further toward the base of the keel 102 near the ribs of the carcass. The horizontal incision 39 formed by the knife 32 is preferably formed along a line that extends below the sternum 104, and continues toward the keel base (near where the vertical incision 37 is formed) as the belt 20 drives the keel downstream, thereby avoiding any bone in the keel portion 102' removed.

Figure 5I:
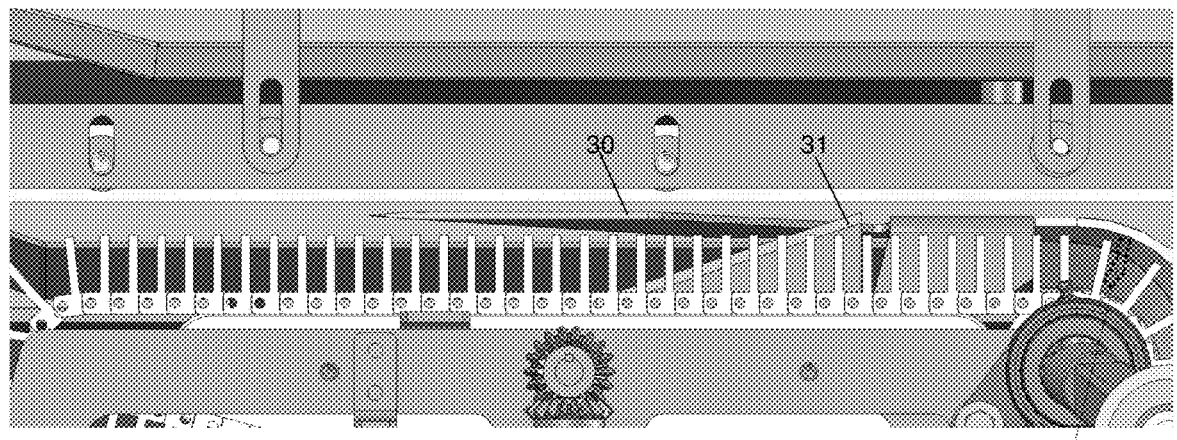
FIG. 5I is a top view illustrating the embodiment of FIG. 5H with the keel shown further downstream than in the view of FIG. 5H.

As shown in FIGS. 3 and 5I, the sharp edge 31 extends laterally past the blade 30, which ensures that the keel portion 102' that extends between the vertical incision 37 formed by the blade 30 and the intersecting horizontal incision 39 formed by the knife 32 completely separates from the carcass. Upon separating, the keel portion 102' may remain in the gap 23 between the pair of plates 22 it was positioned in until it reaches a position further downstream or even behind the machine. Alternatively, the keel portion 102' may fall down immediately upon being severed, falling immediately into a collecting bin or onto a conveyor or other collecting means.

As pointed out above, there are various alternative structures contemplated as alternatives to the belt 20. These structures must be capable of conveyance at substantially the same speed substantially parallel to the path of the cone line 11. They also must have keel-receiving gaps, which may be defined by spaces between planar panels, as described above. Such keel-receiving gaps may be formed in solid structures that have sufficient longitudinal and vertical space to form a void that may accept a keel. In addition, gaps may be formed between vertically-aligned groups of pins extending from a continuous loop, such as a flexible belt. Panels may be formed by structures with voids, such as screens, and with sufficient strength, such panels may substitute for those described above in detail. One purpose of the spaced members that panels, pins and other structures function as is to resist movement of the keel during incising of the keel. The keel rests against the upstream-most member of the pair of members that defines the keel-receiving gap so that as the keel is forced into the blade and/or the knife the keel continues downstream through the blade and the knife. Such alternative spaced members may prove sufficient if they can support the keel as it is being incised.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The embodiments of the invention in which an exclusive property or privilege is claimed are defined as follows:

1. An apparatus for removing a keel from a poultry carcass that is conveyed at a predetermined speed along a path, the apparatus comprising:

(a) a plurality of spaced members disposed adjacent the path and defining at least one gap between the spaced members that is configured to receive the keel, the spaced members being configured to move at the predetermined speed; and (b) a blade disposed adjacent the path and the spaced members, the blade having an edge configured to sever the keel from the poultry carcass.

2. The apparatus in accordance with claim 1, further comprising a keel guide disposed adjacent the path and spaced from the plurality of spaced members for contacting the keel and adjusting the position of the keel relative to the blade.

3. The apparatus in accordance with claim 1, further comprising a ramp disposed adjacent the path, the ramp having a surface angled relative to the path for contacting, and adjusting a vertical position relative to the blade of, the poultry carcass.

4. The apparatus in accordance with claim 3, further comprising a keel guide disposed adjacent the path and spaced from the plurality of spaced members for contacting the keel and adjusting the keel relative to the blade.

5. The apparatus in accordance with claim 4, further comprising a knife with a sharp edge mounted in the path adjacent to the blade.

6. The apparatus in accordance with claim 5, wherein the knife's sharp edge is disposed above the blade's edge and faces away from the plurality of spaced members, and the blade's edge faces downwardly.

7. The apparatus in accordance with claim 6, wherein the knife's sharp edge is disposed at least partially in a groove formed in the plurality of spaced members between a top edge of the plurality of spaced members and a lower edge of the plurality of spaced members.

8. An apparatus for removing a keel from a poultry carcass that is conveyed at a predetermined speed along a path, the apparatus comprising:

(a) a plurality of plates extending radially outwardly from a continuous loop configured to be driven adjacent the path at the predetermined speed, wherein at least one pair of plates defines a keel-receiving gap therebetween that is configured to receive at least the keel;

(b) a stationary blade with a sharp edge disposed between the path and the continuous loop for severing the keel from the carcass;

(c) a ramp disposed above the path, the ramp having a downwardly-facing surface angled to the path for contacting, and adjusting a vertical position relative to the blade of, the poultry carcass; and (d) a keel guide disposed adjacent the path and spaced from the plurality of plates for contacting the keel and adjusting the keel relative to the blade.

9. The apparatus in accordance with claim 8, further comprising a knife with a sharp edge mounted in the path adjacent to the blade.

10. The apparatus in accordance with claim 9, wherein the knife's sharp edge is disposed above the blade's sharp edge and faces away from the plurality of plates, and the blade's sharp edge faces downwardly.

11. The apparatus in accordance with claim 10, wherein the knife's sharp edge is disposed at least partially in a longitudinal groove formed in the plurality of plates between a top edge of the plurality of plates and a lower edge of the plurality of plates.

12. The apparatus in accordance with claim 11, wherein the continuous loop further comprises a top member that is rectangular and a bottom member that is triangular, with a gap therebetween that forms the longitudinal groove.

13. A method of removing a keel from a poultry carcass that is conveyed along a path at a predetermined speed, the method comprising:

(a) driving a continuous loop adjacent the path at the predetermined speed, the continuous loop having at least one pair of plates extending radially outwardly therefrom to define a keel-receiving gap therebetween that receives at least the keel;

(b) disposing a ramp above the poultry carcass, wherein the ramp has a surface angled to the path for adjusting the poultry carcass on the elongated member relative to the blade;

(c) disposing a keel guide adjacent the path and spaced a predetermined distance from the plurality of plates for adjusting the keel relative to the blade; and (d) conveying the keel into at least one blade mounted between the path and the continuous loop, thereby severing the keel from the carcass.

14. The method in accordance with claim 13, further comprising the step of disposing a sharp edge of a knife at least partially in a longitudinal groove formed in the plurality of plates between a top edge of the plurality of plates and a lower edge of the plurality of plates.

* * * * *